(12) United States Patent
Den Boer et al.

(10) Patent No.: US 9,833,785 B2
(45) Date of Patent: Dec. 5, 2017

(54) METHOD OF MAKING A PROCESSOR DISK

(71) Applicants: Nolan Den Boer, Rock Valley, IA (US); Thad De Jager, Rock Valley, IA (US)

(72) Inventors: Nolan Den Boer, Rock Valley, IA (US); Thad De Jager, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 329 days.

(21) Appl. No.: 13/716,366

(22) Filed: Dec. 17, 2012

(65) Prior Publication Data
US 2014/0166797 A1 Jun. 19, 2014

(51) Int. Cl.
| | |
|---|---|
| *B02C 4/08* | (2006.01) |
| *B02C 7/12* | (2006.01) |
| *B23P 15/28* | (2006.01) |
| *A01D 43/10* | (2006.01) |
| *A01D 82/02* | (2006.01) |

(Continued)

(52) U.S. Cl.
CPC .............. *B02C 4/08* (2013.01); *A01D 43/10* (2013.01); *A01D 82/02* (2013.01); *B02C 4/30* (2013.01); *B02C 7/12* (2013.01); *B23K 26/342* (2015.10); *B23P 15/00* (2013.01); *B23P 15/28* (2013.01);

(Continued)

(58) Field of Classification Search
CPC ... B02C 7/12; B02C 4/08; B23P 15/28; B23P 15/00; B23K 26/345; B23K 26/342
USPC ............ 76/101.1, 115; 241/296; 219/121.64; 29/891
See application file for complete search history.

(56) References Cited

U.S. PATENT DOCUMENTS 4,144,777 A * 3/1979 Nystrom et al. ................ 76/112
4,727,778 A * 3/1988 Omi ................................. 76/115
(Continued)

FOREIGN PATENT DOCUMENTS

| DE | 19604008 | 8/1996 |
|---|---|---|
| EP | 1945017 | 4/2005 |

(Continued)

OTHER PUBLICATIONS

"Carbinite", product web page; pp. 1-2; Carbinite Metal Coatings, Butler, Pennsylvania; date unknown.

(Continued)

*Primary Examiner* — Jason Daniel Prone
(74) *Attorney, Agent, or Firm* — Jeffrey A. Proehl; Woods, Fuller, Shultz & Smith, P.C.

(57) ABSTRACT

A method of forming a processor disk for a processor of materials may include providing a disk blank with a central portion and a perimeter portion, with the perimeter portion extending between the central portion and a circumference of the disk blank, the perimeter portion having a perimeter surface; and applying material to the perimeter portion of the disk blank to form a plurality of teeth on at least the perimeter surface of the perimeter portion. A processor disk may include a disk blank with a central portion and a perimeter portion, with the perimeter portion extending between the central portion and a circumference of the disk blank and having a perimeter surface divided into opposite side surfaces by a circumferential edge; and a plurality of teeth formed on the perimeter surface through application of material to the perimeter surface.

1 Claim, 12 Drawing Sheets

(51) Int. Cl.
*B23P 15/00* (2006.01)
*B23K 26/342* (2014.01)
*B02C 4/30* (2006.01)
*B23K 101/20* (2006.01)

(52) U.S. Cl.
CPC ..... *B23K 2201/20* (2013.01); *Y10T 29/49448* (2015.01)

(56) References Cited

U.S. PATENT DOCUMENTS

| | | | |
|---|---|---|---|
| 4,854,196 A * | 8/1989 | Mehan | 76/101.1 |
| 4,911,037 A * | 3/1990 | Werz | 76/112 |
| 5,230,259 A * | 7/1993 | Sheldon | 76/101.1 |
| 5,285,768 A * | 2/1994 | Messina | 76/112 |
| 5,488,774 A * | 2/1996 | Janowski | 30/346.53 |
| 5,544,550 A * | 8/1996 | Smith | 76/DIG. 6 |
| 5,855,149 A * | 1/1999 | Islam et al. | 76/115 |
| 5,868,125 A * | 2/1999 | Maoujoud | 76/112 |
| 5,921,727 A * | 7/1999 | Depperman | 76/108.1 |
| 5,932,508 A * | 8/1999 | Armstrong et al. | 76/DIG. 12 |
| 6,035,844 A * | 3/2000 | Otani et al. | 76/108.1 |
| 6,209,420 B1 * | 4/2001 | Butcher et al. | 76/108.2 |
| 6,363,827 B1 * | 4/2002 | Osing et al. | 76/112 |
| 6,454,030 B1 * | 9/2002 | Findley et al. | 76/108.2 |
| 6,612,204 B1 * | 9/2003 | Droese et al. | 76/104.1 |
| 6,868,755 B2 * | 3/2005 | Yabuki et al. | 76/115 |
| 7,060,367 B2 * | 6/2006 | Yamada et al. | 30/346.53 |
| 7,210,388 B2 * | 5/2007 | Pacher et al. | 30/349 |
| 7,373,857 B2 * | 5/2008 | Dion et al. | 76/112 |
| 7,827,883 B1 | 11/2010 | Cherng | |
| 8,096,221 B2 * | 1/2012 | Tarrerias | 76/106.5 |
| 8,104,378 B2 * | 1/2012 | Ahorner | 76/112 |
| 8,109,176 B1 * | 2/2012 | Kooima | 76/104.1 |
| 8,505,414 B2 * | 8/2013 | Culf | 76/101.1 |
| 8,769,833 B2 * | 7/2014 | Culf | 30/350 |
| 8,946,585 B2 * | 2/2015 | Kappmeyer | 76/101.1 |
| 8,991,144 B2 * | 3/2015 | Clauss et al. | 56/16.4 C |
| 2001/0006013 A1 * | 7/2001 | Nobauer et al. | 76/112 |
| 2004/0060396 A1 * | 4/2004 | Tichler et al. | 76/112 |
| 2008/0072411 A1 * | 3/2008 | Ahorner et al. | 76/112 |
| 2009/0038166 A1 * | 2/2009 | Crichton et al. | 76/115 |
| 2009/0139373 A1 * | 6/2009 | Merz | 76/112 |
| 2010/0325902 A1 * | 12/2010 | Dutta et al. | 76/104.1 |
| 2012/0144680 A1 * | 6/2012 | Scillia et al. | 30/350 |
| 2012/0227547 A1 * | 9/2012 | Maisser et al. | 76/104.1 |
| 2013/0192441 A1 * | 8/2013 | Ehrle et al. | 76/101.1 |
| 2013/0269498 A1 * | 10/2013 | Loukus et al. | 76/112 |
| 2013/0316771 A1 * | 11/2013 | Frommelt | 460/150 |
| 2014/0082948 A1 * | 3/2014 | Staub | 76/112 |
| 2014/0190328 A1 * | 7/2014 | Karlen | 76/112 |
| 2014/0321931 A1 * | 10/2014 | Gey | 76/108.6 |
| 2015/0096422 A1 * | 4/2015 | Stoddart et al. | 76/112 |
| 2015/0135905 A1 * | 5/2015 | Maurer | 76/115 |

FOREIGN PATENT DOCUMENTS

| | | |
|---|---|---|
| FR | 2853266 | 10/2004 |
| JP | 05345220 A * | 12/1993 |
| WO | 2007051834 | 5/2007 |
| WO | 2011028074 | 3/2011 |

OTHER PUBLICATIONS

"New KernelStar technology represents next phase in advanced forage processing from John Deere"; web page, www.deere.com/wps/dcom/en_INT/our_company/news_and_media/press_releases/, download date Nov. 19, 2012, 3 pages.

* cited by examiner

METHOD OF MAKING A PROCESSOR DISK

BACKGROUND

Field

The present disclosure relates to crop processing equipment and more particularly pertains to a new processor disk and method of making the disk in a more efficient manner that may provide a more durable disk.

Description of the Prior Art

Machinery has been developed for processing crop materials passing through harvesting machinery such as, for example, a forage harvester. The processing machinery is generally designed to "crack" or crush or break open the kernels of the crop to make the nutrition of the crop more available to livestock consuming the processed crop material. Conventionally, the processing was performed by cylindrical rolls or rollers that rotate with a small gap between the rolls such that the kernels in the crop materials passing between the rolls are pinched and crushed to break the outer skin of the kernel. The rolls may have linear teeth that extend the length of the roll between the opposite ends.

Other types of processors have been developed that use elements other than rolls, or at least rolls that are not cylindrical in shape. For example, processors that utilize groups of disks mounted on spaced, parallel axes with a degree of partial intermesh have been developed. In some implementations of this concept, the disks may have a beveled perimeter region located adjacent to the circumference so that the axial thickness of the disk decreases toward the circumference of the disk and increases toward the center of the disk. The tapered perimeter regions of disks turning on one axis are positioned in close proximity to the tapered perimeter regions of the disks turning on another axis. A serpentine or "zig-zag" gap is formed between the disks of the two rows with a greater surface area between the arrays of disks in a smaller space than can be achieved with cylindrical rolls. The greater surface area between the arrays of disks may provide a distinct advantage over cylindrical roll-based processors in that the crop materials may be passed through the processor faster, and therefore the forage harvester may move through the agricultural field faster than a harvester utilizing a roll-based processor.

The disks typically have teeth formed on at least the surface of the tapered perimeter regions, and the teeth may have an arcuate and semi helical shape between the outer circumference and the inner termination of the tooth, which is usually at the border of the tapered region. The teeth on the disks of one array of disks are thus closely positioned, although spaced from the teeth on the disks on the other array of disks.

The teeth on the disks have been formed by removing material from the disks through machining the surface of the disks, particularly the surface on the tapered perimeter region of the disks.

SUMMARY

In one aspect, the disclosure related to a method of forming a processor disk for a processor of crop materials including providing a disk blank with a central portion and a perimeter portion, with the perimeter portion extending between the central portion and a circumference of the disk blank and the perimeter portion having a perimeter surface. The method may also include applying material to the perimeter portion of the disk blank to form a plurality of teeth on at least the perimeter surface of the perimeter portion.

In another aspect, the disclosure relates to a processor disk that may comprise a disk blank with a central portion and a perimeter portion, with the perimeter portion extending between the central portion and a circumference of the disk blank and the perimeter portion having a perimeter surface. A plurality of teeth may be formed on the perimeter surface through application of material to the perimeter surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 10 thereof, a new processor disk, and method of making, embodying and implementing the principles and concepts of the disclosed subject matter will be described.

Disks used on processors, such as those used to process crop materials, have a series of teeth positioned along the perimeter region of the disk. Applicants have recognized that forming teeth on the tapered surfaces of the perimeter regions of the disks in a conventional manner involves unnecessary effort which translates into more time and greater cost. Machining the teeth into the disk, which is conventional, is a difficult and time intensive operation that tends to make processors employing disks produced in this way significantly more expensive than processors utilizing cylindrical rolls, and tends to make disk-based processors less cost competitive with roll-based processors despite the greater efficiency and speed possible with the disk-based processors.

Applicants have recognized that rather than using the conventional techniques of removing material from disk blanks to form the teeth, it is advantageous to instead add material to the disk blank to form the teeth. The additive approach is easier and less time consuming to achieve, less wasteful of material since no material is removed, can provide teeth formed of a much harder and durable material than the base material of the disk blank, and non-uniform shaping of the teeth is easier to produce if desired.

Applicants have devised a method and system to form the teeth of the disks using an additive technique, such as laser deposition, which produces teeth that may have characteristics that are different from that of the disk base or blank upon which the teeth are formed. As the teeth of the disk tend to receive most of the wearing contact with the crop materials, more durable materials may be utilized for forming the teeth without having to include those materials in the disk blank.

In one aspect, a processor system 10 is provided with a plurality of processor disks 12 which are mounted on a pair of shafts 14, 16 that are supported in a frame suitable to support the shafts. The shafts and disks, as well as a supporting frame, may be positionable in an agricultural machine such as a forage harvester, although other applications for an apparatus utilizing the disks may be envisioned. The shafts may have pulleys mounted thereon, and be connected by one or more belts to a mechanism suitable for rotating the shafts, and the disks mounted thereon. Suitable frames and mechanism are known by those skilled in the art.

Figure 10:
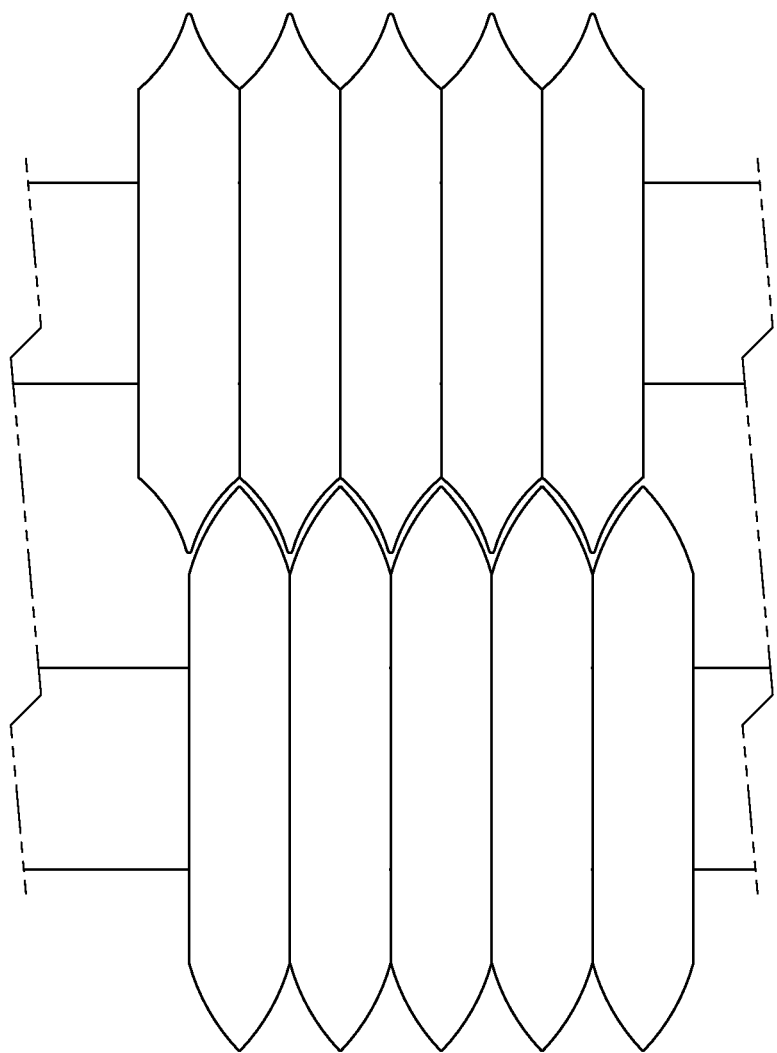
FIG. 10 is a schematic side view of a plurality of processor disks mounted on shafts of the processor, and according to an illustrative embodiment the disks of the shafts have complementary concave and convex perimeter surfaces.

An illustrative embodiment of the processor disk 12 is generally formed from a disk blank. The disk 12 may include a central portion 18 and a perimeter portion 20. The perimeter portion 20 may extend between the central portion 18 and a circumference 22 of the disk blank. The circumference of the disk may be formed by an edge 24 which may be thin and generally circular, but this is not critical. The perimeter portion 20 may have a perimeter surface 26, and the perimeter surface may be divided by the circumferential edge 24 into opposite side surfaces 28, 29. The perimeter portion 20 may have a thickness that tapers thinner from the central portion 18 to the circumference 22, and thus tapers thicker from the circumference to the central portion. The opposite side surfaces 28, 29 of the perimeter portion diverge from the circumference 22. The opposite side surfaces may be frusta-conical in shape although other shapes for the side surfaces may be employed, such as, for example, shapes with slightly convex and concave character that may be complimentarily arranged on the shaft (such as is shown in FIG. 10). Except for the teeth, and prior to the addition of material to form teeth, a side surface may be substantially smooth without any significant variation or ridges or valleys.

The central portion 18 may have opposite central surfaces 30, 31, and may have a substantially uniform thickness, although this is not critical. The central portion may have an aperture 34 that extends through the central portion between the surfaces 30, 31.

Figure 1:
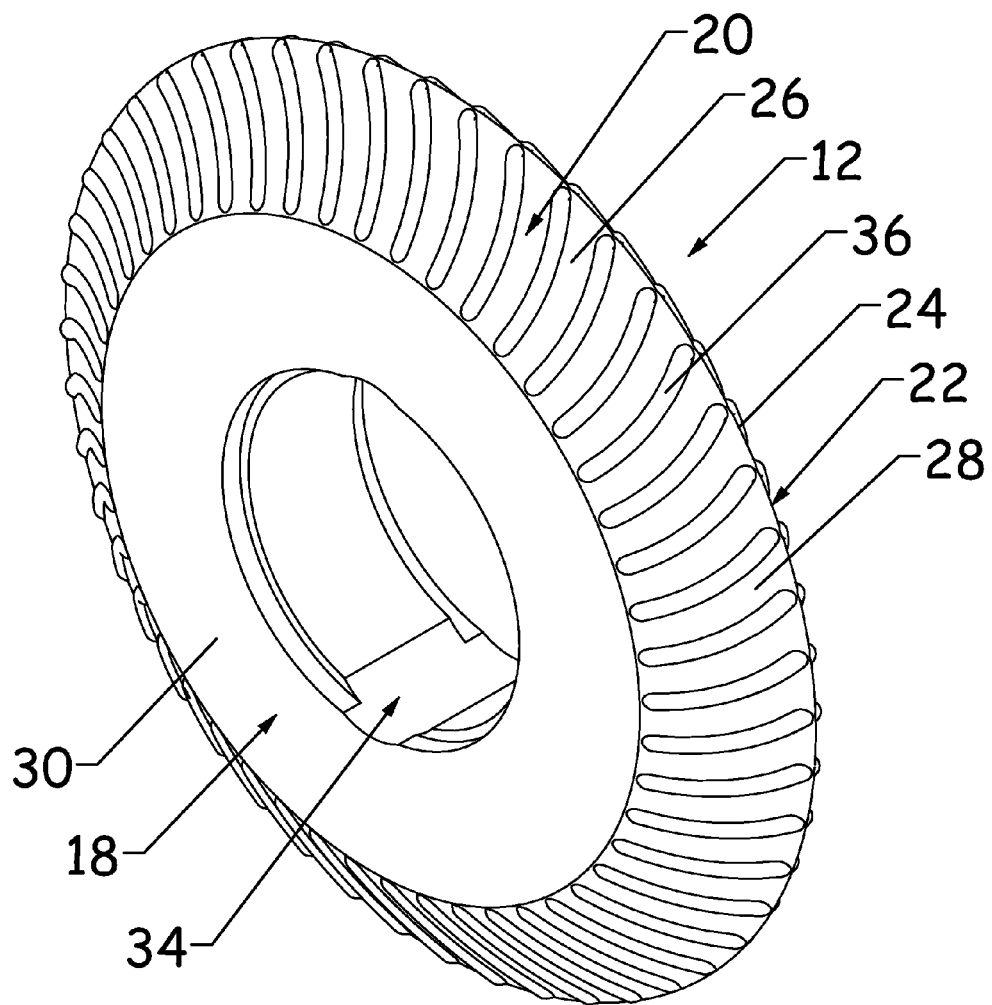
FIG. 1 is a schematic perspective view of a new processor disk formed according to aspects of the present disclosure.
Figure 2:
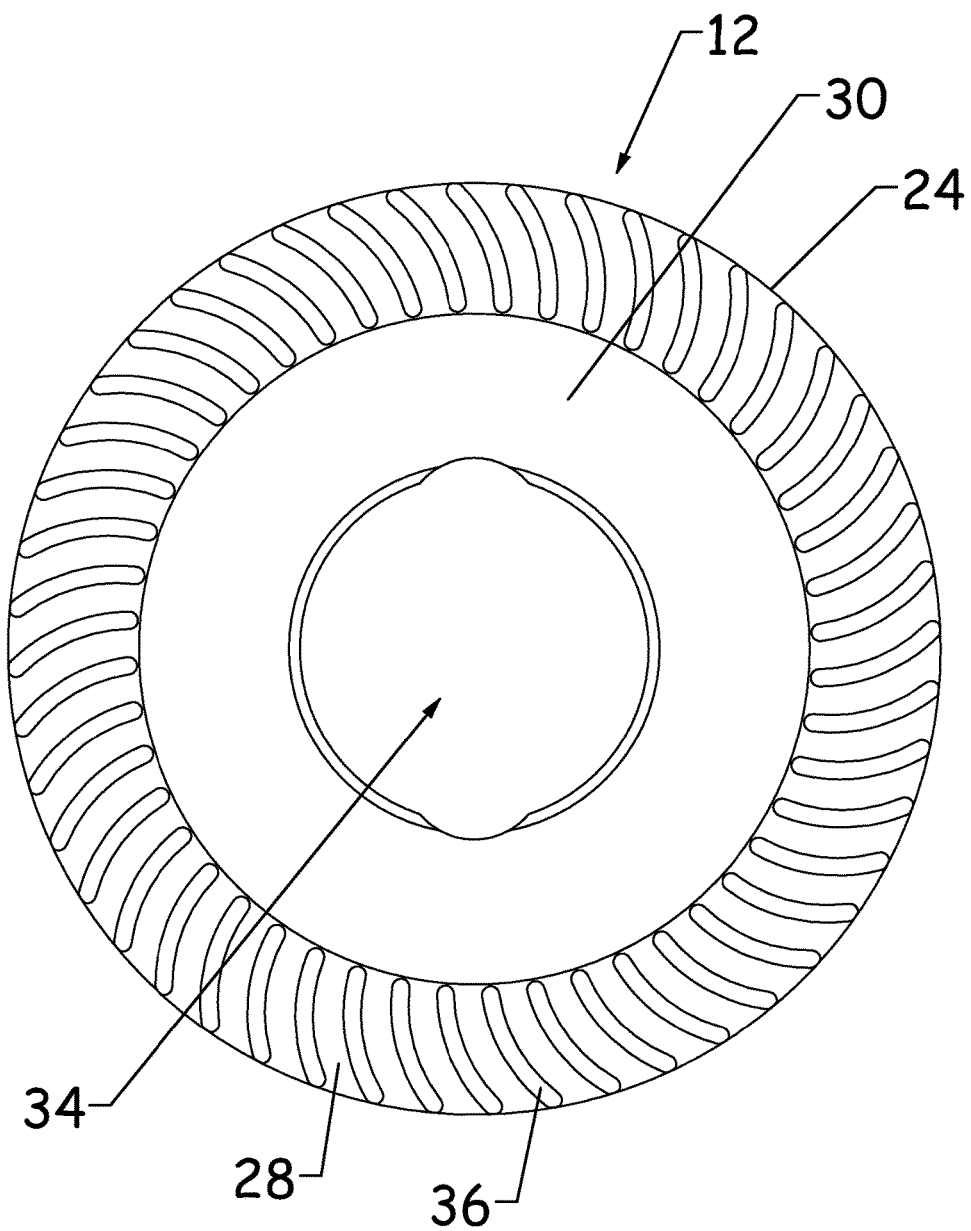
FIG. 2 is a schematic front view of the processor disk, according to an illustrative embodiment.
Figure 3:
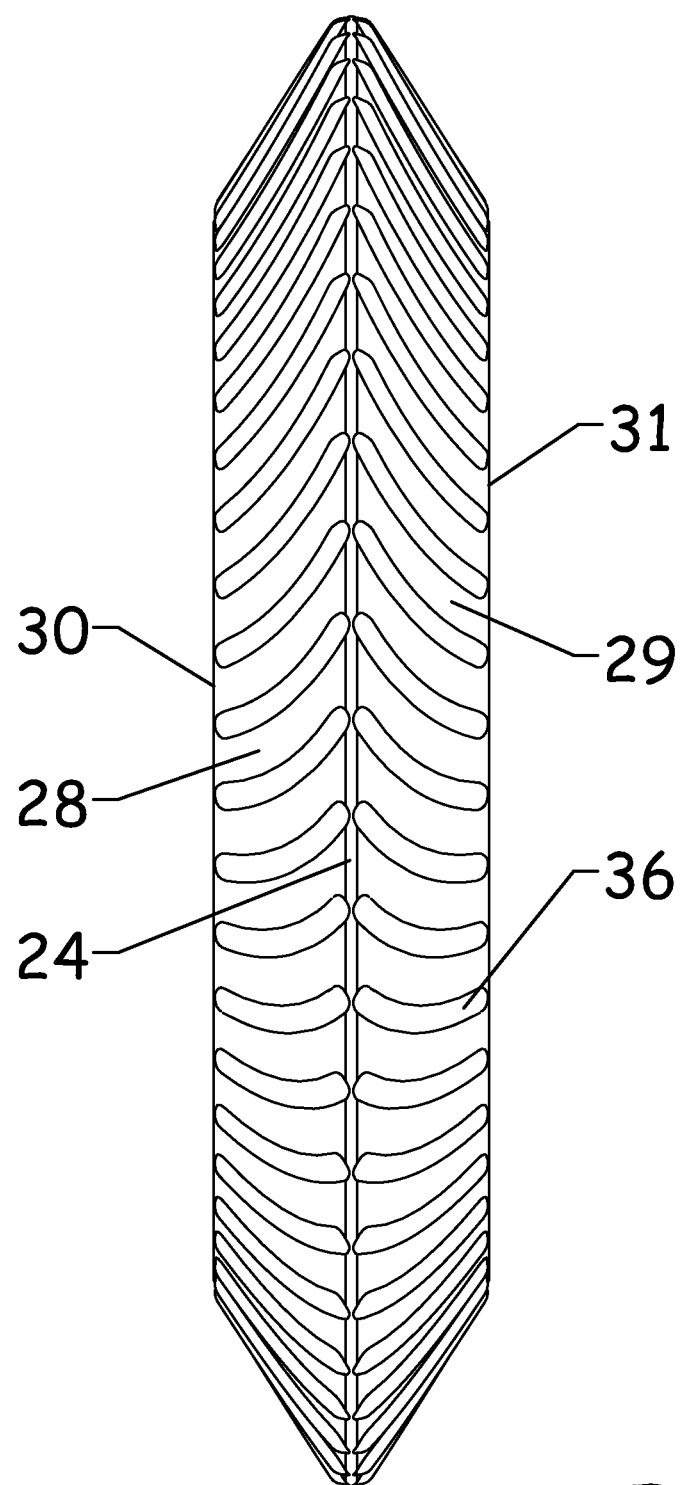
FIG. 3 is a schematic side view of the processor disk, according to an illustrative embodiment.
Figure 4:
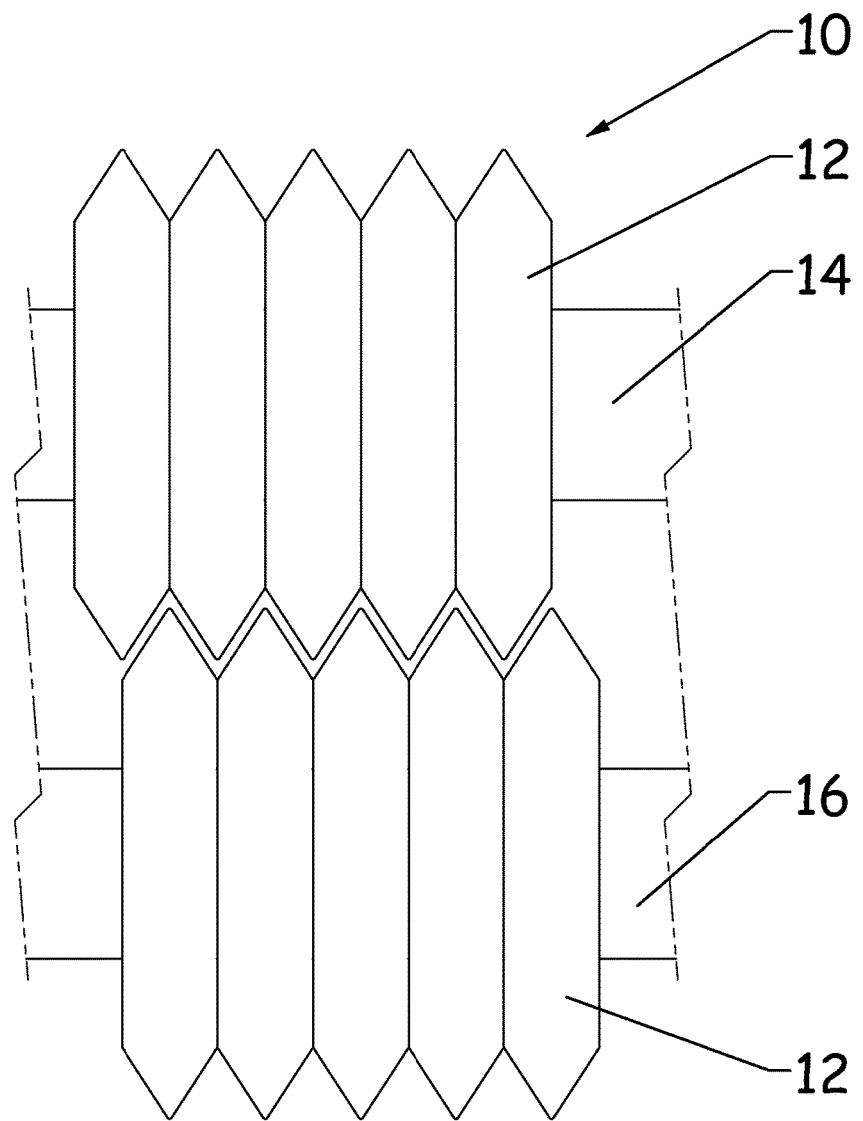
FIG. 4 is a schematic side view of a plurality of processor disks mounted on shafts of the processor, according to an illustrative embodiment, with other elements of the processor removed to reveal the relationship.
Figure 5:
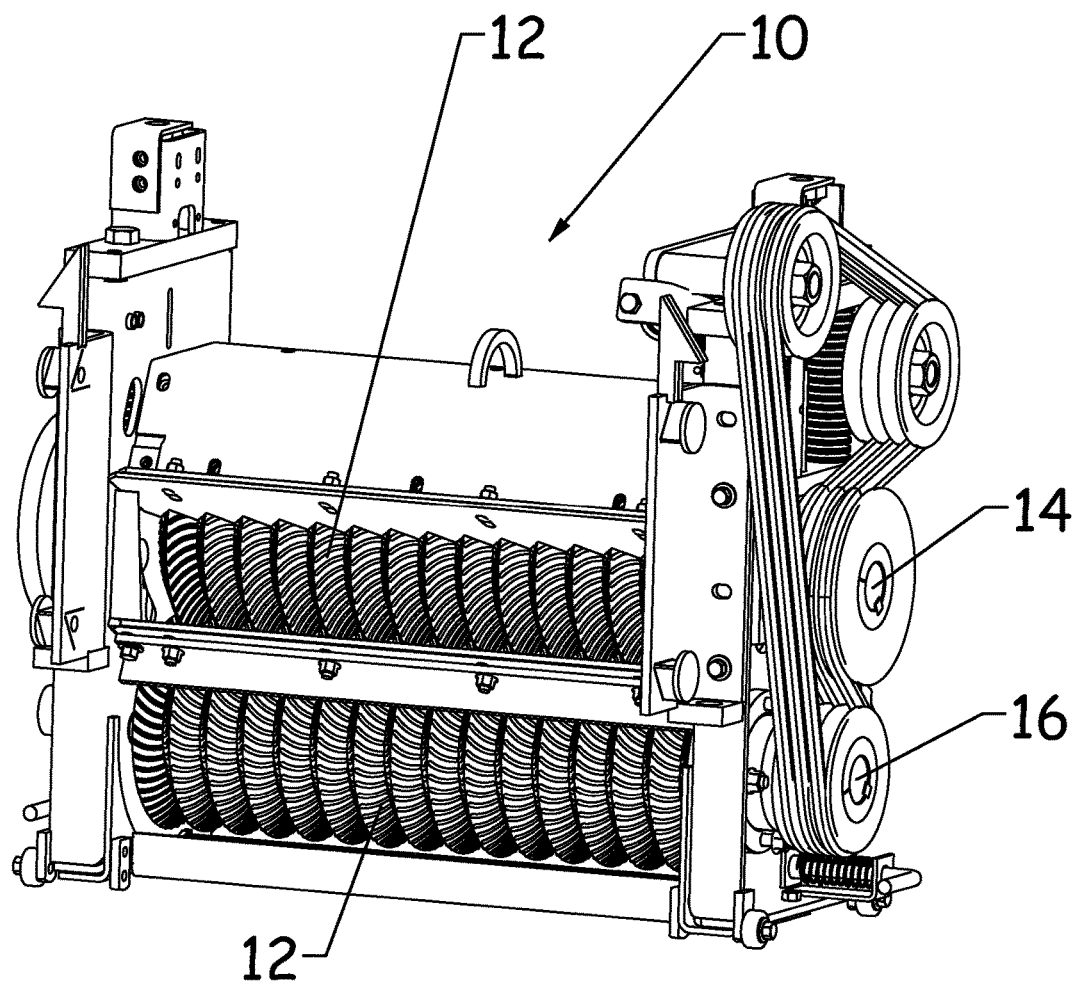
FIG. 5 is a schematic perspective view of an illustrative processor, according to an illustrative embodiment.
Figure 6A:
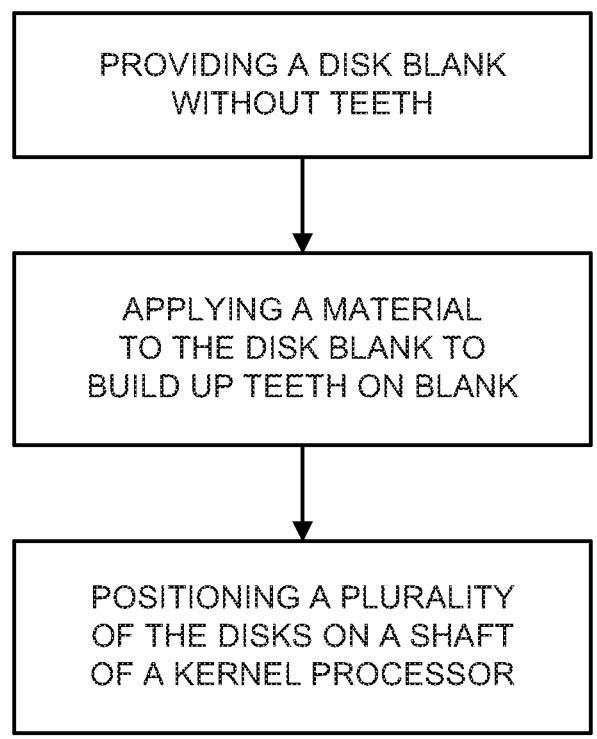
FIG. 6A is a schematic diagram of a method of forming a processor disk and optionally utilizing the formed disk on a processor, according to an illustrative implementation.
Figure 6B:
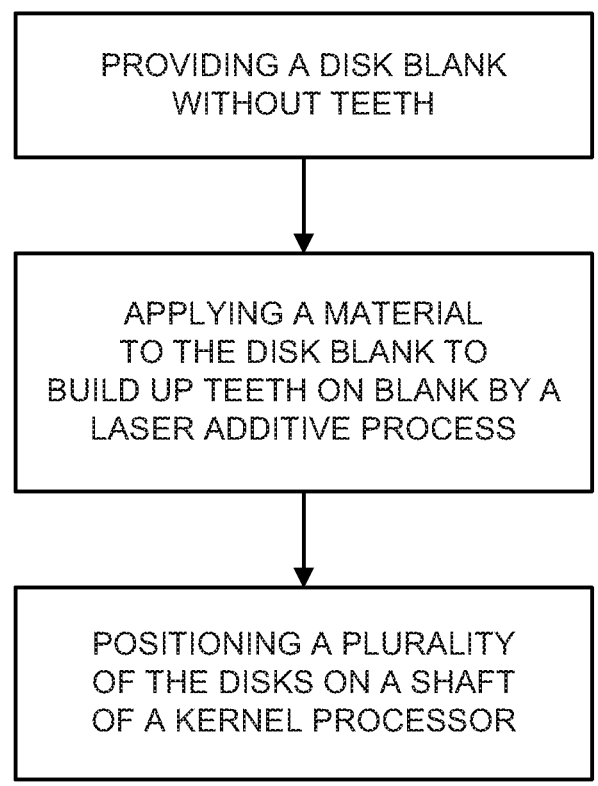
FIG. 6B is a schematic diagram of a further illustrative implementation of a method of forming a processor disk and optionally utilizing the formed disk on a processor.
Figure 6C:
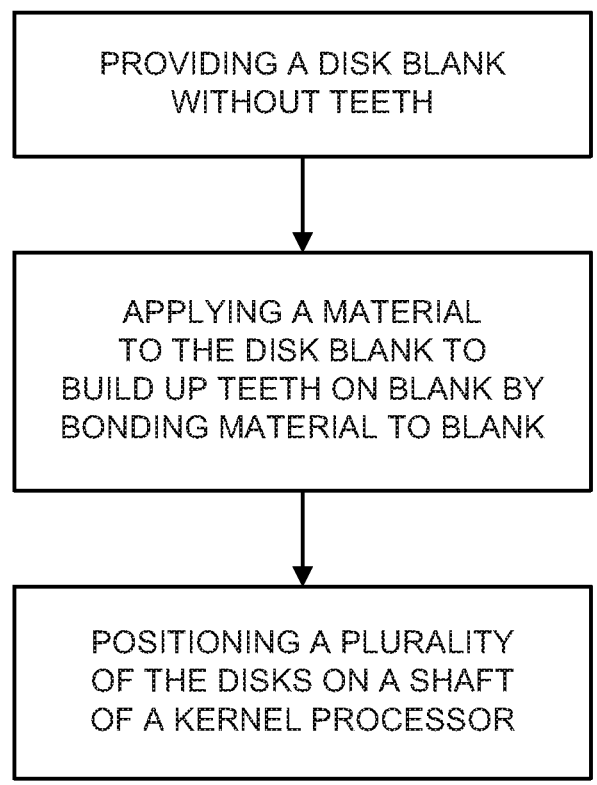
FIG. 6C is a schematic diagram of a still further illustrative implementation of a method of forming a processor disk and optionally utilizing the formed disk on a processor.
Figure 7:
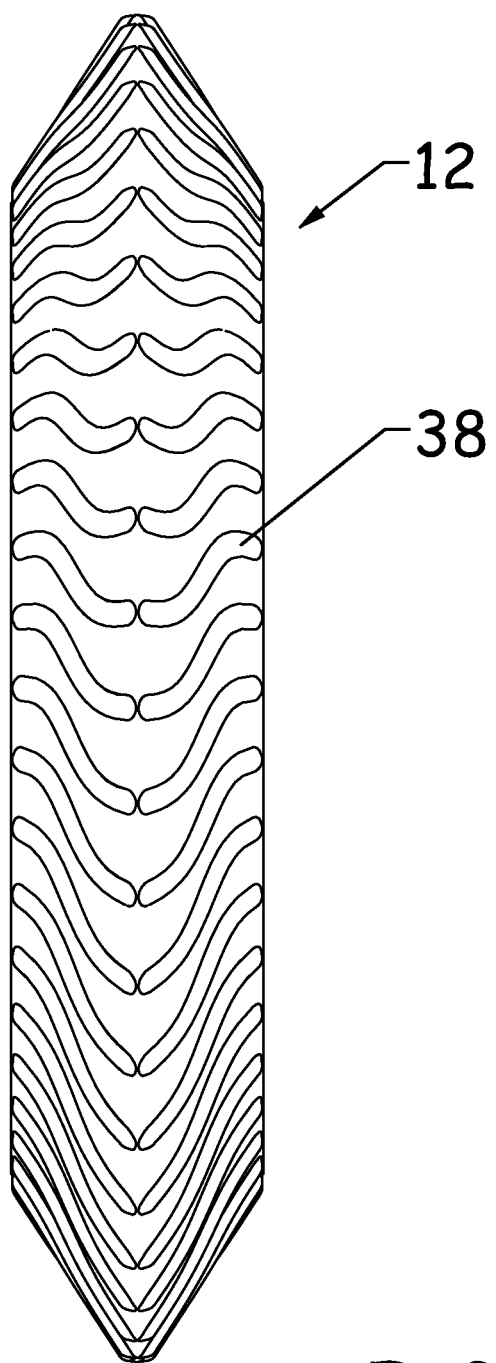
FIG. 7 is a schematic side view of a disk with an optional S-shape tooth configuration.
Figure 8:
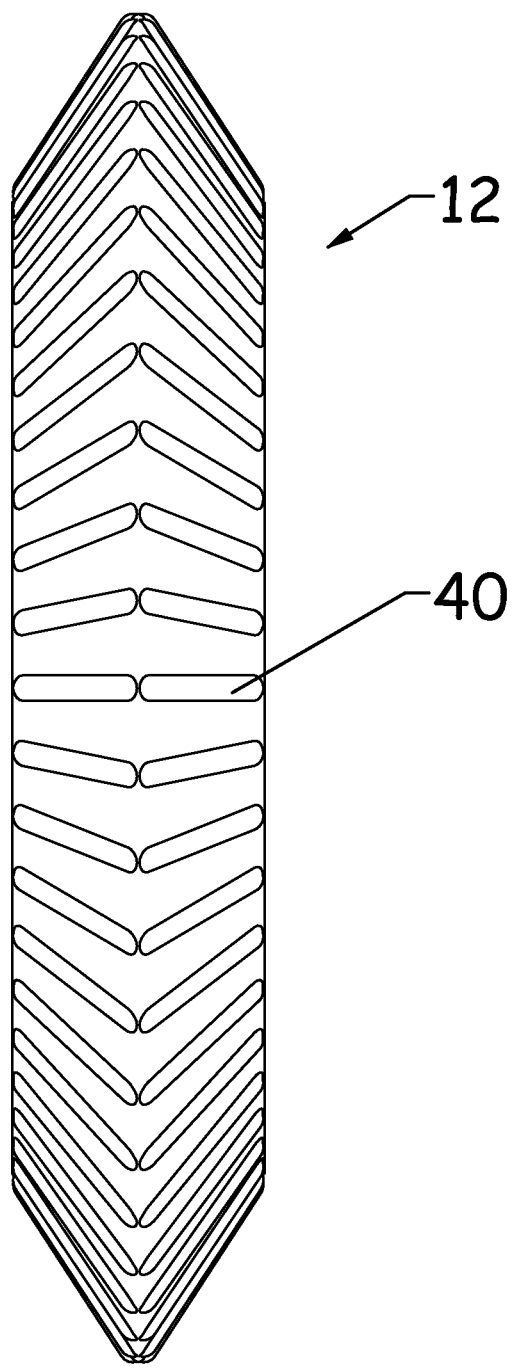
FIG. 8 is a schematic side view of a disk with an optional straight tooth shape configuration.
Figure 9:
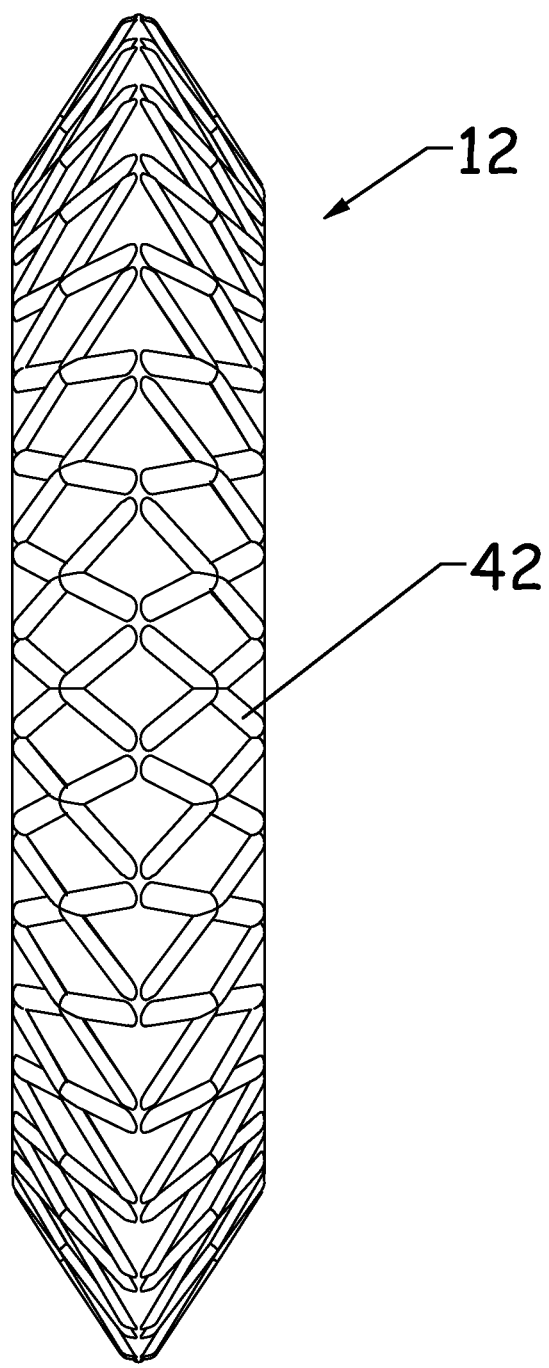
FIG. 9 is a schematic side view of a disk with an optional X-shape tooth configuration.

A plurality of teeth 36 are formed on the disk blank, and may be located on the perimeter portion. The teeth may be formed on each side of the circumferential edge 22, and may extend generally from the circumference 22 toward the central portion, although the teeth do not necessarily have to extend to the central portion or to the circumference. The teeth may have a substantially arcuate shape (see, e.g., FIGS. 1 through 5) between the circumference and the central portion, with a forward or rearward curvature, although the teeth may also have serpentine or S-shape (see, e.g., teeth 38 in FIG. 7), a substantially straight or linear shape (see, e.g., teeth 40 in FIG. 8), or an X-shape (see, e.g., teeth 42 in FIG. 9). In most embodiments, the teeth are not be designed or shaped with the purpose of intermeshing with other teeth, such as teeth formed on another disk. The teeth may be uniformly spaced from the adjacent teeth, although this is not critical, and some teeth may intersect, such as is shown in FIG. 9. In some embodiments, the teeth may have a substantially triangular cross sectional shape, although this is not critical to the functionality of the disk, and other shapes may be employed.

The teeth 36 may be formed by the application of material to the disk blank. Ridges may be formed on the perimeter surface 26 with portions of the perimeter surface being left exposed between the ridges to form depressed areas or valleys between the ridges. Material may be bonded to the perimeter portion 20, and more specifically to the side surfaces 28, 29 of the disk. The teeth 36 may include materials or material particles that are melted to bond with each of the opposite side surfaces of the perimeter portion. In some embodiments, the teeth may extend in a somewhat curved path between the central portion and the circumference such that the teeth have a chevron-like appearance when viewed from the perspective of the circumferential edge.

The areas of the perimeter surface of the perimeter portion between the teeth may remain uncoated or uncovered and thus exposed after the forming of the teeth on the disk blank, so that the perimeter surface between the ridges of the teeth may be substantially smooth and not necessarily characterized by a groove or valley formed of converging surfaces.

One highly preferred technique of forming the teeth on the disk is through the use of any suitable laser additive manufacturing or laser deposition techniques to deposit a material, or a composition of materials, to the surface of the disk. Highly suitable compositions may include materials such as tungsten carbide and/or other relatively wear-resistant materials. The use of such wear resistant materials can extend the useful life of the disk, and may allow for the use of materials such as carbide in the teeth that would not be suitable in forming the disk blank upon which the teeth are formed. Further, the use of very hard, wear-resistant materials such as tungsten carbide can make machining of (including removal of material from) the material difficult, and use of such materials for the disk blank and then removing material to form teeth is not practical and would preclude the use of such materials when machining is required. Optionally, the teeth formed on the disk blank in the manners described may be subjected to finishing processes that may include removal of some material to achieve, for example, a desired finish and/or a desired shape. Such removal of material may be accomplished by various techniques including, but not limited to, grinding and polishing. It should be recognized that the finishing is optional as there is no intermeshing of the teeth or ridges on the disks of the processor, and thus there may be no need to achieve a precise profile or shape for the teeth.

When the teeth have been formed on the disk 12, the disk may be positioned on one of the shafts 14, 16 of the processor system 10 in a manner than may provide close proximity of the teeth of the disks on one shaft to the teeth of the disks on the other shaft. Typically, the teeth of the disks on the opposite shafts do not intermesh or contact each other, and in some applications one shaft may rotate at a different speed than the other shaft.

In another aspect, the disclosure relates to a method of forming a processor for crop materials, which may include providing at least one disk blank having a central portion 18 and a perimeter portion 20 that may extend between the central portion and a circumference 22 of the disk blank. The perimeter portion of the disk blank may be formed with a perimeter surface that is divided by the circumference into opposite side surfaces, and with the thickness of the disk blank tapering thinner from the central portion to the circumference. The opposite side surfaces on the perimeter portion may thus be formed so as to diverge from the circumference such that the circumference may be formed by a thin edge.

The method may also include applying material to the perimeter portion 20 of the disk blank to form a plurality of teeth, and may include forming ridges raised up from the perimeter surface 26 of the disk blank. The forming of the ridges of the teeth may include the step of bonding a material to the perimeter portion, and in some preferred implementations may include using laser deposition to apply material to the perimeter portion. The step of bonding material to the perimeter portion may include melting particles of the material to the perimeter surface of the perimeter portion.

The method may further include positioning the processor disk 12 on a shaft 14, and may include positioning a plurality of the processor disks 12 on the shaft 14 and another substantially parallel shaft 16 such that the teeth on the perimeter portions of the processor disks on the shafts are positioned in opposition to each other with a small gap therebetween through which crop materials may be passed to crush or crack the kernels in the crop materials, and otherwise break down the crop materials.

Applicants have additionally recognized that processors of conventional design may suffer from premature belt wear and failure, and have also recognized that increasing the contact area or wrap of the belt on the circumference of the pulleys on the shafts supporting the disks will reduce the premature failure problem to a significant degree. Applicants have further determined that the shaft spacing in conventional designs tends to prevent an increase in belt wrap. To address this problem, applicants have increased the distance between the shafts in some embodiments so that the distance between shafts is over approximately 7 inches (approximately 178 cm), and may be approximately 7.5 inches (approximately 190 cm). In contrast, conventional designs utilize a significantly smaller shaft spacing, such as 6 inches (approximately 150 cm). In some embodiments, applicants have further increased the diameter of the disks in some embodiments to a size over approximately 8 inches (approximately 200 cm), and may be approximately 8.5 inches (approximately 215 cm). In contrast, conventional designs utilize a significantly smaller diameter, such as 7.8 inches (approximately 198 cm), which tends to require the shafts to be closer together. Also, in some embodiments, the applicants have increased the angle of the bevel of the side surface 28, 29 with respect to the respective central surface 30, 31 to over approximately 25 degrees, and in some further embodiments over approximately 30 degrees, and in some still further embodiments to approximately 33 degrees. In contrast, conventional designs utilize disks with a bevel of about 22 degrees, which also tends to require the shafts to be closer together.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:
1. A method of forming a processor disk for a processor of materials, including:
   providing a disk blank with a central portion and a perimeter portion, the perimeter portion extending between the central portion and a circumference of the disk blank, the perimeter portion having a perimeter surface; and
   applying material to the perimeter surface of the perimeter portion of the disk blank to form a plurality of teeth on at least the perimeter surface of the perimeter portion, the step of applying material to the perimeter portion is performed by a laser deposition additive process;
   wherein the step of applying the material to the perimeter surface of the perimeter portion comprises bonding particles of the material to the perimeter portion through the laser deposition additive process such that the particles collectively form the teeth.

\* \* \* \* \*